United States Patent [19]

Gottschlich et al.

[11] 4,161,428

[45] Jul. 17, 1979

[54] DEVICE FOR RECOVERING OIL PRODUCTS FROM OIL SANDS

[75] Inventors: Herbert Gottschlich, Uehlfeld; Christian Koch, Erlangen; Konrad Künstle, Röttenbach, all of Fed. Rep. of Germany

[73] Assignee: Kraftwerk Union Aktiengesellschaft, Mülheim, Fed. Rep. of Germany

[21] Appl. No.: 837,388

[22] Filed: Sep. 28, 1977

[30] Foreign Application Priority Data

Oct. 6, 1976 [DE] Fed. Rep. of Germany ....... 2645137

[51] Int. Cl.[2] .......................... C10G 1/04; B01D 11/02

[52] U.S. Cl. .............................. 196/14.52; 208/11 LE

[58] Field of Search ................. 196/14.52; 208/11 LE

[56] References Cited

U.S. PATENT DOCUMENTS

| | | | |
|---|---|---|---|
| 2,665,238 | 1/1954 | Truitt et al. | 208/11 LE |
| 2,910,424 | 10/1959 | Tek et al. | 208/11 LE |
| 3,509,037 | 4/1970 | Tse | 208/11 LE |
| 3,738,929 | 6/1973 | Terry et al. | 208/11 LE |
| 3,972,688 | 8/1976 | Cornelius et al. | 23/288 K |

FOREIGN PATENT DOCUMENTS

| | | | |
|---|---|---|---|
| 638415 | 3/1962 | Canada | 208/11 LE |
| 970309 | 7/1975 | Canada | 208/11 LE |
| 971124 | 7/1975 | Canada | 208/11 LE |

*Primary Examiner*—Barry S. Richman

*Attorney, Agent, or Firm*—Herbert L. Lerner

[57] ABSTRACT

System for recovering oil products from oil sands in which superheated steam from a nuclear reactor is mixed with water in a chamber under high superatmospheric pressure to obtain hot water at a temperature near the boiling point at the prevailing pressure. The hot water enters a reaction tube which has an input screw conveyor for feeding oil sands into the reaction tube in contact with the hot water to effect release of the oil from the sands. The outlet of the reaction tube opens into a hydrocyclone into which the reaction products of oil and sand and water are discharged. A screw conveyor at the bottom of the hydrocyclone discharges separated sand and some water which passes into a settling tank to settle the sand and the clarified water is filtered and returned to the pressure chamber. The separated oil together with some water from the hydrocyclone flows to an oil separator where the oil separates from the water, which latter is also returned to the pressure chamber. The oil may be separated into fractions in a fractionating column and the column bottoms may be hydrogenated and returned to the fractionating column. Better oil recovery from the oil sand can be achieved and more efficient operation attained.

4 Claims, 1 Drawing Figure

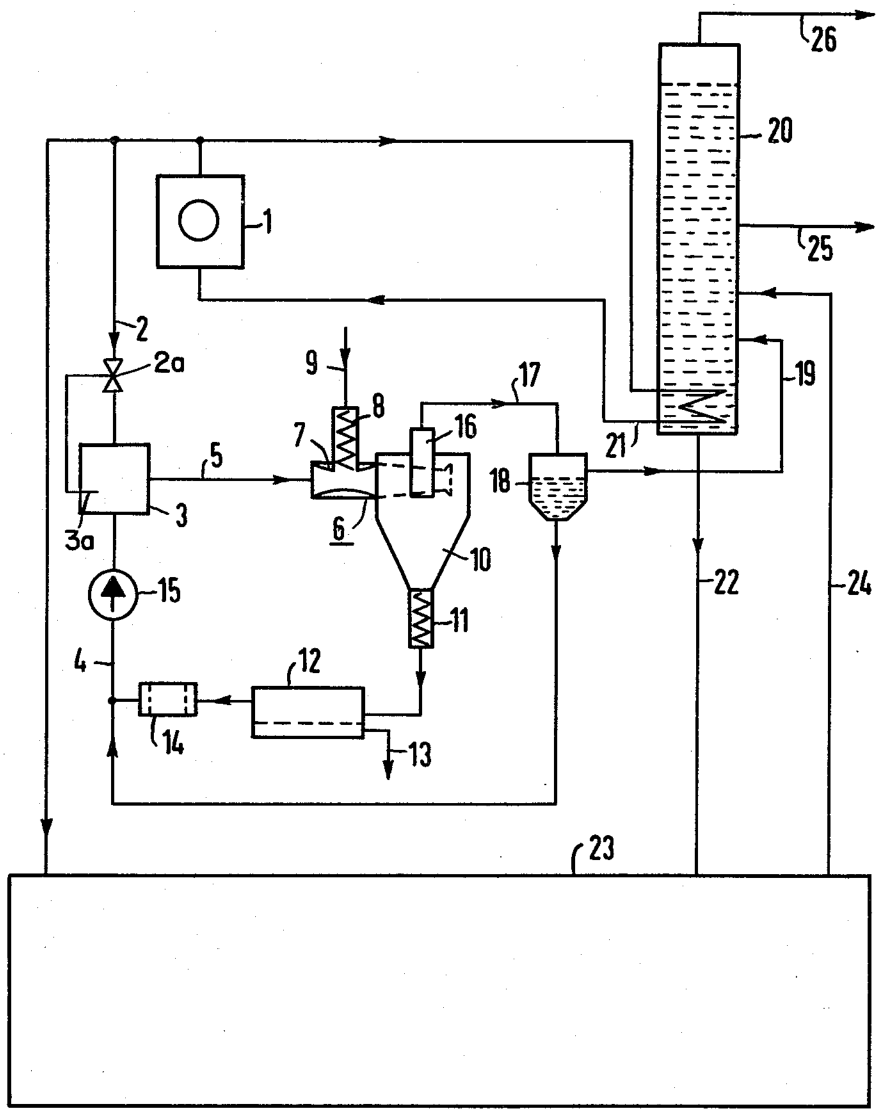
1
2
2a
3
3a
4
5
6
7
8
9
10
11
12
13
14
15
16
17
18
19
20
21
22
23
24
25
26

DEVICE FOR RECOVERING OIL PRODUCTS FROM OIL SANDS

BACKGROUND OF THE INVENTION

1. Field of the Invention

This invention relates to separating oil from sand or shale and more particularly refers to recovering oil products from oil sands.

2. Description of the Prior Art

Oil shale is a fine-grained, usually dark-colored sedimentary rock containing complex organic matter which, on heating decomposes to yield oil. Oil sand, sometimes referred to as a bituminous sand, asphalt rock, or tar sand is a loose sand or sandstone impregnated with very viscous oil.

The oil supplies of the world stored in oil sands or in oil shale exceed the crude oil reserves of the Arabic countries by several times. The problem of recovering oil from oil sands or shale is essentially that of the high cost of transporting the oil sand and of separating the oil from the sand. In the article "Tar Sand and Shale as Oil Reserves" in the journal Handelsblatt of May 3/4, 1974, page 33, a process is described in which the oil is separated from the sand by means of hot water.

SUMMARY OF THE INVENTION

An object of the present invention is to provide a system for separating oil from sand or shale by means of which a high crude oil yield from the oil sand can be achieved.

With the foregoing and other objects in view, there is provided in accordance with the invention an apparatus for recovering oil products from oil sands including an enclosed pressure vessel for mixing steam and water under high superatmospheric pressure, a first inlet in said enclosed pressure vessel for the introduction of water under high superatmospheric pressure, a nuclear reactor, superheated steam under high superatmospheric pressure from the nuclear reactor, a second inlet in the enclosed pressure vessel for the introduction of the superheated steam under high superatmospheric pressure to heat the water entering the vessel, a hot water outlet in the pressure vessel for the discharge of heated water, an elongated tubular reaction chamber, a hot water conduit for conducting the heated water from the hot water outlet to one end of the elongated tubular reaction chamber, an input screw conveyor extending from an opening in the elongated tubular reaction chamber for feeding oil sands from an external source into the reaction chamber in direct contact with the hot water to effect release of oil from the sands, a hydrocyclone for separating solids from liquids, the other end of the elongated tubular reaction chamber opening into the hydrocyclone for discharge of hot water and reaction products consisting primarily of oil and sand, an output screw conveyor extending from the bottom of the hydrocyclone for the discharge of sand together with some water separated therein, an enlarged settling tank for receiving the sand and water from the output conveyor to permit the sand to settle at the bottom of the tank with clarified water above the sand, a water filter connected to the settling tank for the flow of clarified water through the water filter to remove suspended solid matter in the water, a crude oil separator chamber connected to the hydrocyclone for receiving from the hydrocyclone separated oil together with some water and wherein the oil and water separate in layers in the crude oil separator, an oil discharge in the separator chamber for the discharge of the oil layer, a water discharge in the separator chamber for the withdrawal of the water layer, and a water feed pump for returning the water from the water filter and the water from the crude oil separator under high superatmospheric pressure to the enclosed pressure vessel.

Other features which are considered as characteristic for the invention are set forth in the appended claims.

Although the invention is illustrated and described herein as embodied in a device for recovering oil products from oil sands, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing, in which is diagrammatically illustrated a system for recovering oil products from oil sands by mixing oil sand and hot water.

DETAILED DESCRIPTION OF THE INVENTION

A steam-water mixer which may be any suitable vessel constructed to withstand pressure is provided for generating hot water under high superatmospheric pressure. By high superatmospheric pressure is meant a pressure in excess of 30 bar, preferably in excess of 50 bar, and desirably between 50 and 200 bar. Into the steam-water mixer runs a steam line through which flows superheated steam under high superatmospheric pressure generated by the heat of a nuclear reactor. A water return line for returning previously used water in the system also leads into the steam-water mixer.

The superheated steam heats the water in the steam-water mixer to a temperature approaching its boiling point which because of the high superatmospheric pressure in the mixer is quite high. The pressure should be sufficiently high to permit the water to be heated to a temperature sufficient to cause effective removal of the oil from the sands, preferably at a temperature in excess of 500° F. and desirably within the range of 500°-600° F. The steam-water mixer is followed by a reaction tube with an input screw conveyor for the oil sand.

The reaction tube is an elongated tubular chamber with a diameter which may vary from about 2 inches to 6 inches or more depending on the throughput of the operation. Hot water from the steam-water mixer is introduced into one end of the tubular chamber.

An opening is provided in the tubular chamber at a point beyond the introduction of hot water for the entry of oil sands. The oil sands are impelled into the tubular chamber by a screw conveyor which may be a well known single-screw conveyor or twin-screw conveyor. The hot water comes in intimate contact with the oil sands in the tubular chamber with the hot water softening, melting and washing at least the major part of the oil free from the sand. Some decomposition may take place and there may be produced some light hydrocarbons. Under the high pressure conditions at least part of the light hydrocarbons will remain in solution in the crude oil. A construction may be provided in the tubular chamber into which the oil sands enter. By introducing the hot water ahead of the constriction more intimate contact is provided between the hot water and the oil sands.

The reaction products consisting principally of oil and sand together with hot water discharge from the other end of the tubular chamber which opens into a hydrocyclone. The hydrocyclone has a conical bottom with a screw conveyor at the lower end for the discharge of sand together with some water separated in the hydrocyclone. The sand and water from the output screw conveyor is transferred to a suitable settler which may be a large vessel adequate to hold a relatively stagnant body of sand and water to permit the sand to settle to the bottom of the vessel with the clarified water on top of the sand. The water may contain some particles of solid matter and is therefore run through the usual water filter to remove the solid particles. The purified water is fed to the suction side of a pressure pump and forced under high superatmospheric pressure into the steam-water mixer.

The oil also referred to as crude oil, separated in the hydrocyclone together with some water is transferred to a crude oil separator which is a chamber of sufficient volume to hold a body of immiscible liquids which will separate into layers. Here the body of liquid of crude oil and water will separate into an oil layer and a water layer which can be separately withdrawn. The water layer is returned to the steam-water mixer under high superatmospheric pressure by means of the pressure pump. The crude oil layer may be withdrawn as a product or may be subjected to fractionation or other treatment.

Referring to the drawing, from a nuclear reactor 1, which may be, for instance, a pressurized water reactor, steam with a pressure of about 60 bar is fed via a steam line 2 to a steam-water mixer 3. The amount of steam may be regulated by a valve 2*a* in line 2. Opening and closing of the valve 2*a* may be controlled by the temperature in mixer 3 as determined by a thermocouple 3*a* inserted therein. The fed-in steam is condensed and heats the water, which is likewise fed to the steam-water mixer 3 from a water return line 4, to approximately the boiling temperature at a pressure of 60 bar. The hot water so obtained flows through a hot-water line 5 into a reaction tube 6. An input screw conveyor 8 feeds into the reaction tube 6 open at a constriction 7. The oil sand is brought into the reaction tube 6 from a conveyer line 9. The reaction tube 6 projects into a hydrocyclone 10, in which the oil, which at the prevailing high temperature and the high pressure readily separates from the sand, is separated by the centrifugal force. The mixture of water and sand, which collects on the outside, gets to a settling tank 12 via an output screw conveyor 11 of the hydrocyclone 10. The sand collecting at the bottom of the settling tank is returned to the oil sands deposit via a conveyer line 13. The water gets back into the water return line 4 via a water filter 14. A feed pump 15 serves to maintain the circulation.

A mixture of crude oil and water collects at the center of the hydrocyclone 10. This mixture is conducted from the liquid outlet 16 of the hydrocyclone via a liquid line 17 to a crude oil separator 18. The water settling out there likewise gets into the water return line 4, while the crude oil is fed via a crude oil line 19 to a conventional fractionating tower 20 wherein the crude oil is separated in fractions, preferably at reduced pressure, desirably at about atmospheric pressure. The distilling column 20 is advantageously heated via a heating coil 21 likewise with steam from the nuclear reactor 1. The residue or bottoms from the bottom of the distilling tower 20 are discharged through line 22.

It is known to hydrogenate oil from oil sands. The residue or tower bottoms withdrawn from the bottom of column 20 is sent through line 22 into hydrogenator 23 wherein the residue is hydrogenated into hydrogenated oil. Hydrogen may be supplied to hydrogenator 23 from an external source not shown, or may be produced by reaction of steam with the oil in known manner. The hydrogenated oil from hydrogenator 23 is returned via oil line 24 into fractionating tower 20. The oil in tower 20 is separated by fractional distillation into light hydrocarbons, generally hydrocarbons having 1–6 carbon atoms, released as a fraction from the top of tower 20 through line 26; a raw distillate which may for example contain hydrocarbons having 6–16 carbon, withdrawn as a fraction from an intermediate point in the tower through line 25, and a residue containing the heavier hydrocarbons withdrawn as a fraction from the bottom of tower 20 through line 22.

In this arrangement, it is no longer necessary to use a large part of the recovered oil for generating hot water. By treating the oil sand with hot water under high pressure, a mixture is produced in the reaction tube 6 which is readily separable in the connected hydrocyclone 10 and which makes a further substantial increase of the crude oil yield. By directly connecting the distilling column 20 to the crude oil separator 18 and to the hydrogenating arrangement 23 for the treatment of the residue, using the steam generated in the nuclear reactor, there is obtained a high-value raw distillate of low viscosity which remains liquid at low ambient temperature for transport to the refinery proper. In this manner, an economical and also environment-compatible method for recovering oil from oil sands is obtained by avoiding combustion processes.

There are claimed:

1. Apparatus for recovering oil products from oil sands comprising (a) a separate enclosed pressure vessel for mixing steam and water in the absence of oil sands under high atmospheric pressure, (b) a first inlet in said enclosed pressure vessel for the introduction of water under high superatmospheric pressure, (c) a nuclear reactor, (d) superheated steam under high superatmospheric pressure from said nuclear reactor, (e) a second inlet in said enclosed pressure vessel for the introduction of said superheated steam under high superatmospheric pressure to heat said water entering said vessel, (f) a hot water outlet in said pessure vessel for the discharge of heated water, (g) an elongated tubular reaction chamber having a constriction at a point intermediate its ends, (h) a hot water conduit for conducting said heated water from said hot water outlet to one end of said elongated tubular reaction chamber, upstream said constriction, (i) an input screw conveyor extending from an opening at the constriction in said elongated tubular reaction chamber perpendicularly to the axis of said elongated tubular reaction chamber for feeding oil sands from an external source into said reaction chamber in direct contact with said hot water to effect entrainment of the oil sands and release of oil from the sands, (j) a hydrocyclone for separating solids from liquids, said other end of said elongated tubular reaction chamber extending to and opening into said hydrocyclone for discharge of hot water and reaction products consisting primarily of oil and sand, (k) an output screw conveyor extending from the bottom of said hydrocyclone for the discharge of sand together with some water separated therein, (l) an enlarged settling tank for receiving said sand and water from said output screw conveyor to permit said sand to settle at the bottom of the tank with clarified water above the sand, (m) a water filter connected to the settling tank for the flow of clarified water through the water filter to remove suspended solid matter in the water, (n) a crude oil separator chamber connected to said hydrocyclone for receiving from said hydrocyclone separated oil together with some water and wherein said oil and water separate in layers in said crude oil separator, (o) an oil discharge in said separator chamber for the discharge of the oil layer, (p) a water discharge in said separator chamber for the withdrawal of said water layer, and (q) a water feed pump for returning said water from said water filter and said water from said crude oil separator under high superatmospheric pressure to said enclosed pressure vessel.

2. Apparatus according to claim 1, including control means for regulating the introduction of said superheated steam under high superatmospheric pressure into said second inlet of said enclosed pressure vessel to heat said water in said pressure vessel to a temperature just below the boiling temperature of the water at the prevailing superatmospheric pressure in said pressure vessel.

3. Apparatus according to claim 1, including a fractionating column for separating the oil from the crude oil separator into an overhead fraction of light hydrocarbons, a distillate fraction of heavier hydrocarbons withdrawn from an intermediate point in the fractionating column, and a distillation residue fraction withdrawn from the bottom of the fractionating column.

4. Apparatus according to claim 3 including a hydrogenator for hydrogenating oils with connecting means for passing said distillation residue fraction from the fractionating column to the hydrogenator wherein the residue fraction is hydrogenated and returning the hydrogenated residue fraction to the fractionating column.

* * * * *